US008980406B2

(12) United States Patent
Xu

(10) Patent No.: US 8,980,406 B2
(45) Date of Patent: Mar. 17, 2015

(54) COLOR STABLE INKS AND APPLICATIONS THEREOF

(75) Inventor: Pingyong Xu, Valencia, CA (US)

(73) Assignee: 3D Systems, Inc., Rock Hill, SC (US)

( * ) Notice: Subject to any disclaimer, the term of this patent is extended or adjusted under 35 U.S.C. 154(b) by 109 days.

(21) Appl. No.: 13/596,607

(22) Filed: Aug. 28, 2012

(65) Prior Publication Data
US 2014/0065378 A1 Mar. 6, 2014

(51) Int. Cl.
C09D 11/10 (2014.01)
B32B 3/10 (2006.01)
B05D 1/36 (2006.01)
C09D 11/02 (2014.01)

(52) U.S. Cl.
USPC ........ 428/195.1; 522/173; 427/470; 427/510; 347/88; 264/494

(58) Field of Classification Search
CPC combination set(s) only.
See application file for complete search history.

(56) References Cited

U.S. PATENT DOCUMENTS

| | | | |
|---|---|---|---|
| 2,409,712 A | 10/1946 | Schweitzer | |
| 3,012,991 A | 12/1961 | Schultheis et al. | |
| 3,653,932 A | 4/1972 | Berry et al. | |
| 3,796,678 A | 3/1974 | Bartizal | |
| 3,963,710 A | 6/1976 | Aufdermarsh, Jr. | |
| 4,011,311 A | 3/1977 | Noomen et al. | |
| 4,293,470 A | 10/1981 | Cuscurida | |
| 4,297,501 A | 10/1981 | Becker et al. | |
| 4,334,032 A | 6/1982 | Pattron, Jr. et al. | |
| 4,381,403 A | 4/1983 | Falcone et al. | |
| 4,390,369 A | 6/1983 | Merritt et al. | |
| 4,484,948 A | 11/1984 | Merritt et al. | |
| 4,501,915 A | 2/1985 | McCoy | |
| 4,537,960 A | 8/1985 | Merger et al. | |
| 4,555,357 A | 11/1985 | Kausga et al. | |
| 4,665,146 A | 5/1987 | Tortorello et al. | |
| 4,684,956 A | 8/1987 | Ball | |
| 4,810,820 A | 3/1989 | Slack et al. | |
| 4,830,671 A | 5/1989 | Frihart et al. | |
| 4,851,045 A | 7/1989 | Taniguchi | |
| 4,889,506 A | 12/1989 | Connolly et al. | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,141,749 A | 8/1992 | Herting et al. | |
| 5,151,120 A | 9/1992 | You et al. | |
| 5,162,490 A | 11/1992 | Drawert et al. | |
| 5,195,430 A | 3/1993 | Rise | |
| 5,208,034 A | 5/1993 | Herting et al. | |
| 5,221,335 A | 6/1993 | Williams et al. | |
| 5,286,288 A | 2/1994 | Tobias et al. | |
| 5,372,852 A | 12/1994 | Titterington et al. | |
| 5,389,720 A | 2/1995 | Markusch et al. | |
| 5,389,958 A | 2/1995 | Bui et al. | |
| 5,421,868 A | 6/1995 | Ayalia-Esquilin et al. | |
| 5,496,879 A | 3/1996 | Griebel et al. | |
| 5,507,864 A | 4/1996 | Jaeger et al. | |
| 5,574,078 A | 11/1996 | Elwaki | |
| 5,593,486 A | 1/1997 | Oliver et al. | |
| 5,597,856 A | 1/1997 | Yu et al. | |
| 5,607,501 A | 3/1997 | Fujioka | |
| 5,621,022 A | 4/1997 | Jaeger et al. | |
| 5,780,528 A | 7/1998 | Titterington et al. | |
| 5,881,648 A | 3/1999 | Pavlin | |
| 5,902,841 A | 5/1999 | Jaeger et al. | |
| 5,919,839 A | 7/1999 | Titterington et al. | |
| 6,133,353 A | 10/2000 | Bui et al. | |
| 6,245,829 B1 * | 6/2001 | Meij et al. | 522/175 |
| 6,288,141 B1 | 9/2001 | Malhota | |
| 6,395,811 B1 | 5/2002 | Nguyen et al. | |
| 6,406,531 B1 | 6/2002 | Bui et al. | |
| 6,492,458 B1 | 12/2002 | Pavlin | |
| 6,841,589 B2 | 1/2005 | Schmidt et al. | |
| 6,860,930 B2 | 3/2005 | Wu et al. | |
| 6,946,025 B2 | 9/2005 | Wu et al. | |
| 7,104,773 B2 | 9/2006 | Maekawa et al. | |
| 7,378,460 B2 | 5/2008 | Schmidt et al. | |
| 7,381,254 B2 | 6/2008 | Wu et al. | |
| 7,531,117 B2 | 5/2009 | Ederer et al. | |
| 7,736,578 B2 | 6/2010 | Ederer | |
| 7,767,130 B2 | 8/2010 | Elsner et al. | |
| 7,927,539 B2 | 4/2011 | Ederer | |
| 7,955,537 B2 | 6/2011 | Ederer et al. | |
| 7,967,902 B2 | 6/2011 | Banning et al. | |
| 8,021,730 B2 | 9/2011 | Tsou et al. | |
| 8,029,610 B2 | 10/2011 | Banning et al. | |
| 8,070,866 B2 | 12/2011 | Banning et al. | |
| 2007/0120925 A1 | 5/2007 | Belelie et al. | |
| 2009/0148813 A1 * | 6/2009 | Sun et al. | 433/201.1 |
| 2009/0234041 A1 * | 9/2009 | Belelie et al. | 522/182 |
| 2011/0196057 A1 | 8/2011 | Breton et al. | |

FOREIGN PATENT DOCUMENTS

| | | |
|---|---|---|
| DE | 42 05 713 | 8/1993 |
| DE | 42 05 636 | 12/1994 |
| EP | 0 187 352 | 7/1986 |
| EP | 0 206 286 | 12/1986 |
| EP | 0 819 739 | 1/1998 |
| EP | 0 844 287 | 5/1998 |
| EP | 0 869 161 | 10/1998 |
| EP | 1458825 | 9/2004 |
| EP | 1849842 | 10/2007 |
| EP | 2256170 | 1/2010 |
| EP | 2161312 | 10/2010 |
| GB | 2 294 939 | 5/1996 |
| SU | 438664 | 2/1975 |
| WO | WO 94/04619 | 3/1994 |
| WO | WO 94/14902 | 7/1994 |
| WO | WO 96/02399 | 2/1996 |
| WO | WO 96/02446 | 2/1996 |
| WO | WO 96/10051 | 4/1996 |
| WO | WO 97/12003 | 4/1997 |
| WO | WO 98/26013 | 6/1998 |
| WO | WO 00/11092 | 3/2000 |

OTHER PUBLICATIONS

STN Structure Search Results (Jun. 9, 2014).*
PCT International Search Report for International Application No. PCT/US2013/056155 (5 pages).
PCT Written Opinion of the International Searching Authority for International Application No. PCT/US2013/056155 (5 pages).

* cited by examiner

Primary Examiner — Vu A Nguyen

(57) ABSTRACT

In one aspect, inks for use with a 3D printer are described herein. In some embodiments, an ink comprises a polymerizable material and a reactive wax comprising a saturated alkyl moiety bonded to an ethyleneically unsaturated moiety through a urethane, urea, ester, or carbonate ester linkage, wherein the ink is free or substantially free of non-reactive wax.

13 Claims, No Drawings

COLOR STABLE INKS AND APPLICATIONS THEREOF

FIELD

The present invention relates to inks and, in particular, to inks for use with three dimensional (3D) printing systems.

BACKGROUND

Commercially available three dimensional printers, such as the ProJet™ 3D Printers manufactured by 3D Systems of Rock Hill, S.C., use inks, which are also known as a build materials, that are jetted through a print head as a liquid to form various three-dimensional objects or parts. Other three dimensional printing systems also use an ink that is jetted through a print head. In some instances, the ink is solid at ambient temperatures and converts to liquid at elevated jetting temperatures. In other instances, the ink is liquid at ambient temperatures.

In some instances, post-printing processing of printed parts can alter the appearance of the parts. In particular, heating and/or exposing a printed part to water can result in the development of a white appearance or a white residue on the surface of the part. The passage of time can also cause a printed part to develop a white appearance or surface residue. For some applications, such a residue or white appearance of printed parts is not desired.

SUMMARY

In one aspect, inks for use with a 3D printer are described herein which, in some embodiments, may offer one or more advantages over prior inks. In some embodiments, for example, an ink described herein exhibits color stability, thereby providing finished parts that do not develop a white appearance over time or as a result of post-printing processing. In addition, in some embodiments, an ink described herein when cured exhibits high strength and toughness, thereby providing finished parts that are useful in various engineering applications.

An ink described herein, in some embodiments, comprises a polymerizable material and a reactive wax comprising a saturated alkyl moiety bonded to an ethyleneically unsaturated moiety through a urethane, urea, ester, or carbonate ester linkage, wherein the ink is free or substantially free of non-reactive wax. The polymerizable material and the reactive wax are not the same material but are instead separate components of the ink. In some embodiments, a polymerizable material of an ink described herein is UV-polymerizable or curable. In some embodiments, a polymerizable material comprises one or more species of (meth)acrylates. In addition, in some embodiments, the linkage of a reactive wax of an ink described herein comprises a urethane or urea linkage. Further, in some embodiments, the ethyleneically unsaturated moiety of a reactive wax comprises an alkyl(meth)acrylate moiety. Moreover, in some embodiments, an ink described herein further comprises an additive that promotes rapid curing of the surface of the ink and/or promotes the production of a tack free finished part. In some embodiments, an ink described herein further comprises one or more additives selected from the group consisting of photoinitiators, inhibitors, stabilizing agents, sensitizers, and combinations thereof.

In addition, in some embodiments, an ink described herein exhibits a phase change between about 50° C. and about 80° C. Further, in some embodiments, an ink described herein when cured exhibits a tensile modulus of about 1300 to about 2800 MPa when measured according to ASTM D 638. In some embodiments, an ink when cured exhibits a break elongation of about 5% to about 40% when measured according to ASTM D 638. Moreover, in some embodiments, an ink when cured exhibits a heat deflection temperature ranging from about 50° C. to about 120° C. when tested according to ASTM D 648.

In another aspect, compositions are described herein. In some embodiments, a composition comprises a three-dimensionally printed article comprising an ink, the ink comprising a polymerizable material and a reactive wax comprising a saturated alkyl moiety bonded to an ethyleneically unsaturated alkyl moiety through a urethane, urea, ester, or carbonate ester linkage, wherein the ink is free or substantially free of non-reactive wax. The polymerizable material and the reactive wax of the ink are not the same material but are instead separate components of the ink.

In another aspect, methods of printing a three dimensional article are described herein. In some embodiments, a method of printing a three dimensional article comprises selectively depositing layers of a fluid ink to form the three dimensional article on a substrate, the ink comprising a polymerizable material and a reactive wax comprising a saturated alkyl moiety bonded to an ethyleneically unsaturated alkyl moiety through a urethane, urea, ester, or carbonate ester linkage, wherein the ink is free or substantially free of non-reactive wax. The polymerizable material and the reactive wax of the ink are not the same material but are instead separate components of the ink. In some embodiments, an ink exhibits a phase change upon deposition. Moreover, in some embodiments, a method further comprises supporting at least one of the layers of the ink with a support material, including a water soluble or water dispersible support material.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

The terms "three dimensional printing system," "three dimensional printer," "printing," and the like generally describe various solid freeform fabrication techniques for making three dimensional objects by selective deposition, jetting, fused deposition modeling, multijet modeling, and other techniques now known in the art or that may be known in the future that use a build material or ink to fabricate the three dimensional object.

I. Inks for Use with a 3D Printing System

In one aspect, inks for use with a 3D printing system are described herein. Inks described herein, in some embodiments, may offer one or more advantages over prior inks. In some embodiments, for example, an ink described herein exhibits color stability, thereby providing finished parts that do not develop a white appearance over time or as a result of post-printing processing. Not intending to be bound by theory, it is believed that a white appearance, in some instances, can be caused by the migration of a wax component of a printed part to the surface of the part. Again not intending to be bound by theory, it is believed that the passage of time or post-printing processing can cause such wax migration in printed parts formed from prior inks. The exposure of a printed part to hot water in particular may increase migration of a wax component to the part surface in some instances when prior inks are used. An ink described herein, however, can be used, in some embodiments, to provide 3D printed parts that do not exhibit such color instability. In addition, in some embodiments, an ink described herein can provide one or more other advantages. In some embodiments, for example, an ink described herein when cured exhibits high strength and/or heat resistance, thereby providing finished parts that are useful in various engineering applications.

In some embodiments, an ink for use in a 3D printing system comprises a polymerizable material and a reactive wax comprising a saturated alkyl moiety bonded to an ethyleneically unsaturated moiety through a urethane, urea, ester, or carbonate ester linkage, wherein the ink is free or substantially free of non-reactive wax. The polymerizable material and the reactive wax are not the same material but are instead separate components of the ink. Moreover, in some embodiments, an ink described herein further comprises an additive that promotes rapid curing of the surface of the ink and/or promotes the production of a tack free finished part. In some embodiments, an ink described herein further comprises one or more additives selected from the group consisting of photoinitiators, inhibitors, stabilizing agents, sensitizers, and combinations thereof.

Inks described herein comprise a polymerizable material. In some embodiments, an ink comprises a plurality of polymerizable materials. Any polymerizable material or combination of polymerizable materials not inconsistent with the objectives of the present invention may be used. In some embodiments, a polymerizable material comprises a monomeric chemical species, such as a chemical species having one or more functional groups or moieties that can react with the same or different functional groups or moities of another monomeric chemical species to form one or more covalent bonds, such as in a polymerization reaction. A polymerization reaction, in some embodiments, comprises a free radical polymerization, such as that between points of unsaturation, including points of ethylenic unsaturation. In some embodiments, a polymerizable material comprises at least one ethyleneically unsaturated moiety, such as a vinyl group or allyl group. In some embodiments, a polymerizable material comprises an oligomeric chemical species capable of undergoing additional polymerization, such as through one or more points of unsaturation as described herein. In some embodiments, a polymerizable component comprises one or more monomeric chemical species and one or more oligomeric chemical species described herein. A monomeric chemical species and/or an oligomeric chemical species described herein can have one polymerizable moiety or a plurality of polymerizable moieties.

In some embodiments, a polymerizable material comprises one or more photo-polymerizable chemical species. A photo-polymerizable chemical species, in some embodiments, comprises a ultraviolet (UV)-polymerizable chemical species. In some embodiments, a polymerizable material is photo-polymerizable or photo-curable at wavelengths ranging from about 300 nm to about 400 nm. Alternatively, in some embodiments, a polymerizable material is photo-polymerizable at visible wavelengths of the electromagnetic spectrum.

In some embodiments, a polymerizable material described herein comprises one or more species of (meth)acrylates. As used herein, the term "(meth)acrylate" includes acrylate or methacrylate or mixtures or combinations thereof. In some embodiments, a polymerizable material comprises a urethane (meth)acrylate resin. In some embodiments, a UV polymerizable or curable urethane(meth)acrylate resin can comprise any methacrylate or acrylate resin which polymerizes in the presence of a free radical photoinitiator, is thermally stable in an exposed state for at least one week at the jetting temperature and for at least 4 weeks in an enclosed state, and/or has a boiling point greater than the jetting temperature. In some embodiments, a polymerizable material has a flash point above the jetting temperature. For reference purposes herein, a thermally stable material exhibits no greater than about a 35 percent change in viscosity over a specified time period (e.g., 4 weeks) when measured at the specified temperature (e.g., a jetting temperature of 85° C.) at the beginning and at the end of the time period. In some embodiments, the viscosity change is no greater than about 30 percent or no greater than about 20 percent. In some embodiments, the viscosity change is between about 10 percent and about 20 percent or between about 25 percent and about 30 percent. In some embodiments, the change in viscosity is an increase in viscosity. In addition, the viscosity can be measured according to ASTM D2983.

Urethane(meth)acrylates suitable for use in inks described herein, in some embodiments, can be prepared in a known manner, typically by reacting a hydroxyl-terminated urethane with acrylic acid or methacrylic acid to give the corresponding urethane(meth)acrylate, or by reacting an isocyanate-terminated prepolymer with hydroxyalkyl acrylates or methacrylates to give the urethane(meth)acrylate. Suitable processes are disclosed, inter alia, in EP-A 114 982 and EP-A 133 908. The weight average molecular weight of such (meth) acrylate oligomers is generally in the range from about 400 to 10,000, or from about 500 to 7,000. Urethane(meth)acrylates are also commercially available from the SARTOMER Company under the product names CN980, CN981, CN975 and CN2901, or from Bomar Specialties Co. (Winsted, Conn.) under the product name BR-741. In some embodiments described herein, a urethane(meth)acrylate oligomer has a viscosity ranging from about 140,000 cP to about 160,000 cP at about 50° C. or from about 125,000 cP to about 175,000 cP at about 50° C. when measured in a manner consistent with ASTM D2983. In some embodiments described herein, a urethane(meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

In some embodiments, a polymerizable material comprises one or more low molecular weight materials, such as methacrylates, dimethacrylates, triacrylates, and diacrylates, which can be used in a variety of combinations. In some embodiments, for example, a polymerizable material comprises one or more of tetrahydrofurfuryl methacrylate, triethylene glycol dimethacrylate, 2-phenoxyethyl methacrylate, lauryl methacrylate, ethoxylated trimethylolpropane triacrylate, polypropylene glycol monomethacrylate, polyethylene glycol monomethacrylate, cyclohexane dimethanol diacrylate, and tridecyl methacrylate.

In some embodiments, a polymerizable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

A polymerizable material, in some embodiments, comprises one or more tri(meth)acrylates. In some embodiments, tri(meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate.

In some embodiments, a polymerizable material of an ink described herein comprises one or more higher functional acrylates or methacrylates such as dipentaerythritol monohydroxy pentaacrylate or bis(trimethylolpropane)tetraacrylate. In some embodiments, a (meth)acrylate of an ink has a molecular weight ranging from about 250 to 700.

In some embodiments, a polymerizable material comprises allyl acrylate, allyl methacrylate, methyl(meth)acrylate, ethyl (meth)acrylate, n-propyl(meth)acrylate, n-butyl(meth)acrylate, isobutyl(meth)acrylate, n-hexyl(meth)acrylate, 2-ethylhexyl(meth)acrylate, n-octyl(meth)acrylate, n-decyl(meth)acrylate and n-dodecyl(meth)acrylate, 2-hydroxyethyl(meth)acrylate, 1- and 3-hydroxypropyl(meth)acrylate, 2-methoxyethyl(meth)acrylate, 2-ethoxyethyl(meth)acrylate and 2- or 3-ethoxypropyl(meth)acrylate, tetrahydrofurfuryl methacrylate, 2-(2-ethoxyethoxy)ethyl acrylate, cyclohexyl methacrylate, 2-phenoxyethyl acrylate, glycidyl acrylate, isodecyl acrylate, or a combination thereof.

Non-limiting examples of species of polymerizable materials useful in some embodiments described herein include the following: isobornyl acrylate (IBOA), commercially available from SARTOMER under the trade name SR 506A; isobornyl methacrylate, commercially available from SARTOMER under the trade name SR 423A; and triethylene glycol dimethacrylate, commercially available from SARTOMER under the trade name SR 205.

A polymerizable material can be present in an ink described herein in any amount not inconsistent with the objectives of the present invention. In some embodiments, a polymerizable material is present in the ink in an amount ranging from about 10 weight percent to about 99 weight percent, based on the total weight of the ink. A polymerizable material, in some embodiments, is present in the ink in an amount ranging from about 20 weight percent to about 90 weight percent, from about 30 weight percent to about 80 weight percent, or from about 40 weight percent to about 60 weight percent, based on the total weight of the ink.

Inks described herein also comprise a reactive wax. In some embodiments, an ink comprises a plurality of reactive waxes. Any reactive wax or combination of reactive waxes not inconsistent with the objectives of the present invention may be used. For reference purposes herein, a reactive wax is a wax that comprises one or more functional groups or chemical moieties that can react with a functional group of a polymerizable material described herein, including in a polymerization reaction. For example, in some embodiments, an ethyleneically unsaturated moiety of a reactive wax reacts with an ethyleneically unsaturated moiety of a polymerizable material, including through free radical polymerization or otherwise. In some embodiments, a reactive wax and a polymerizable material each comprise one or more acrylate or methacrylate moieties. In some embodiments, a reactive wax and a polymerizable material each comprise one or more vinyl moieties or one or more vinyl ether moieties. In some embodiments, a reactive wax and a polymerizable material each comprise a plurality of ethyleneically unsaturated moieties described herein.

Reactive waxes described herein comprise a saturated alkyl moiety bonded to an ethyleneically unsaturated moiety through a urethane, urea, ester, or carbonate ester linkage. In some embodiments, the linkage comprises a urethane or urea linkage. In some embodiments, the linkage comprises a urethane linkage.

Moreover, in some embodiments, the saturated alkyl moiety of a reactive wax comprises 2-36 carbon atoms. The saturated alkyl moiety can be linear or branched. In some embodiments, a saturated alkyl moiety comprises 8-30 carbon atoms, 10-28 carbon atoms, or 10-20 carbon atoms. In other embodiments, a saturated alkyl moiety comprises 12-26 carbon atoms, 14-24 carbon atoms, or 14-20 carbon atoms. In some embodiments, a saturated alkyl moiety comprises an octyl, nonyl, decyl, or undecyl moiety. In some embodiments, a saturated alkyl moiety comprises a dodecyl, tridecyl, tetradecyl, pentadecyl, hexadecyl, heptadecyl, octadecyl, nonadecyl, or eicosyl moiety.

Further, in some embodiments, an ethyleneically unsaturated moiety of a reactive wax comprises 3-22 carbon atoms. The ethyleneically unsaturated moiety can be linear or branched. In some embodiments, an ethyleneically unsaturated moiety comprises 4-20 carbon atoms, 4-12 carbon atoms, or 4-8 carbon atoms. In some embodiments, an ethyleneically unsaturated moiety comprises 6-12 carbon atoms. In addition, in some embodiments, an ethyleneically unsaturated moiety of a reactive wax described herein comprises a vinyl moiety or an allyl moiety. In other embodiments, an ethyleneically unsaturated moiety of a reactive wax comprises an alkyl(meth)acrylate. An alkyl(meth)acrylate, in some embodiments, comprises a C2-C18 alkyl(meth)acrylate or a C2-C8 alkyl(meth)acrylate. In some embodiments, an alkyl(meth)acrylate comprises an ethyl, propyl, or butyl (meth)acrylate. In other embodiments, an alkyl(meth)acrylate comprises a pentyl, hexyl, heptyl, octyl, nonyl, or decyl (meth)acrylate.

Moreover, in some embodiments, a reactive wax of an ink described herein comprises the reaction product of an alkyl isocyanate having 2-36 carbon atoms in its alkyl chain and a hydroxyalkyl(meth)acrylate having 2-18 carbon atoms in its alkyl chain. The alkyl chain of one or both of the alkyl isocyanate and the hydroxyalkyl(meth)acrylate, in some embodiments, is linear. In other embodiments, at least one alkyl chain is branched. For example, in some embodiments, the alkyl isocyanate comprises dodecyl isocyanate, tridecyl isocyanate, tetradecyl isocyanate, pentadecyl isocyanate, hexadecyl isocyanate, heptadecyl isocyanate, octadecyl isocyanate, nonadecyl isocyanate, eicosyl isocyanate, or a combination thereof. Further, in some embodiments, the hydroxyl group of a hydroxyalkyl(meth)acrylate comprises a primary alcohol. In other embodiments, the hydroxyl group comprises a secondary alcohol. In some embodiments, a hydroxyalkyl(meth)acrylate comprises hydroxyethyl acrylate, hydroxyethyl methacrylate, hydroxypropyl acrylate, hydroxypropyl methacrylate, hydroxybutyl acrylate, hydroxybutyl methacrylate, or a combination thereof.

In other embodiments, a reactive wax of an ink described herein comprises the reaction product of an isocyanatoalkyl (meth)acrylate having 2-18 carbon atoms in its alkyl chain and a fatty alcohol having 4-36 carbon atoms in its alkyl chain. For example, in some embodiments, an isocyanatoalkyl(meth)acrylate comprises 2-isocyanatoethyl acrylate, 2-isocyanatoethyl methacrylate, 3-isocyanatopropyl acrylate, 3-isocyanatopropyl methacrylate, 4-isocyanatobutyl acrylate, 4-isocyanatobutyl methacrylate, or a combination thereof. A fatty alcohol, in some embodiments, comprises capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, montanyl alcohol, or a combination thereof.

In addition, in some embodiments, a reactive wax of an ink described herein comprises the reaction product of an alkyl isocyanate having 2-36 carbon atoms in its alkyl chain and an aminoalkyl(meth)acrylate having 2-18 carbon atoms in its alkyl chain. The alkyl chain of one or both of the alkyl isocyanate and the aminoalkyl(meth)acrylate, in some embodiments, is linear. In other embodiments, at least one alkyl chain is branched. For example, in some embodiments, the alkyl isocyanate comprises dodecyl isocyanate, tridecyl isocyanate, tetradecyl isocyanate, pentadecyl isocyanate, hexadecyl isocyanate, heptadecyl isocyanate, octadecyl isocyanate, nonadecyl isocyanate, eicosyl isocyanate, or a combination thereof. Further, in some embodiments, the amino group of an aminoalkyl(meth)acrylate comprises a primary amine. In other embodiments, the amino group comprises a secondary amine. In some embodiments, an aminoalkyl(meth)acrylate comprises aminoethyl(meth)acrylate, aminopropyl(meth)acrylate, aminobutyl(meth)acrylate, or a combination thereof.

In other embodiments, a reactive wax of an ink described herein comprises the reaction product of an isocyanatoalkyl (meth)acrylate having 2-18 carbon atoms in its alkyl chain and a fatty amine having 4-36 carbon atoms in its alkyl chain. For example, in some embodiments, an isocyanatoalkyl (meth)acrylate comprises 2-isocyanatoethyl acrylate, 2-isocyanatoethyl methacrylate, 3-isocyanatopropyl acrylate, 3-isocyanatopropyl methacrylate, 4-isocyanatobutyl acrylate, 4-isocyanatobutyl methacrylate, or a combination thereof. A fatty amine, in some embodiments, comprises a linear 1-alkylamine. In some embodiments, a fatty amine comprises a hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine, or eicosylamine.

In some embodiments, a reactive wax of an ink described herein comprises a chemical species of Formula (I):

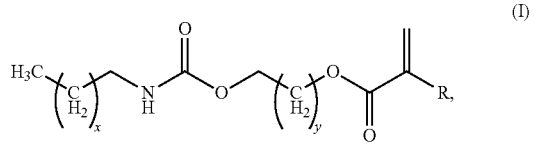

wherein x is an integer from 0 to 34, y is an integer from 1 to 17, and R is H or CH$_3$. In some embodiments, x is an integer from 8 to 20 or from 10 to 16. In some embodiments, y is integer from 1 to 6 or from 1 to 4.

In some embodiments, a reactive wax of an ink described herein comprises a chemical species of Formula (II):

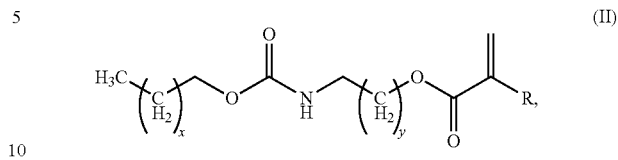

wherein x is an integer from 0 to 34, y is an integer from 1 to 17, and R is H or CH$_3$. In some embodiments, x is an integer from 8 to 20 or from 10 to 16. In some embodiments, y is integer from 1 to 6 or from 1 to 4.

In some embodiments, a reactive wax of an ink described herein comprises a chemical species of Formula (III):

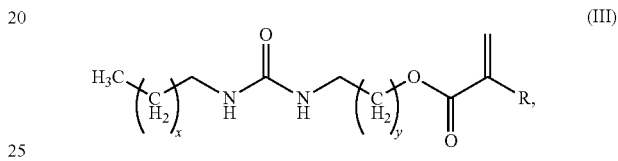

wherein x is an integer from 0 to 34, y is an integer from 1 to 17, and R is H or CH$_3$. In some embodiments, x is an integer from 8 to 20 or from 10 to 16. In some embodiments, y is integer from 1 to 6 or from 1 to 4.

Additionally, in some embodiments, a reactive wax of an ink described herein has a melting point over a broad range of temperatures applicable to 3D printing systems. Reactive waxes useful in some embodiments described herein can exhibit melting point ranges centered at any temperature not inconsistent with the objectives of the present invention. In some embodiments, a reactive wax of an ink described herein exhibits a melting point range centered between about 50° C. and about 80° C., inclusive. In some embodiments, a reactive wax exhibits a melting point range centered between about 55° C. and about 75° C. or between about 60° C. and about 75° C.

Further, a reactive wax described herein, in some embodiments, forms a homogeneous mixture when combined with a polymerizable material described herein, including when the reactive wax and polymerizable material are combined when both are liquid and/or at a jetting temperature of a 3D printing system, such as a 3D printing system designed for use with phase changing inks. A homogeneous mixture, in some embodiments, comprises a mixture that does not exhibit or does not substantially exhibit bulk phase separation between components, such as between a reactive wax and a polymerizable material.

A reactive wax or a plurality of reactive waxes described herein may be present in an ink described herein in any amount not inconsistent with the objectives of the present invention. The amount of a reactive wax in an ink described herein can be selected according to one or a variety of factors, including the jetting temperature of the 3D printing system, the desired viscosity of the ink, the required mechanical integrity of the ink for printing applications, the desired deposition rate of the ink and/or any support material used, the desired break elongation of the cured ink, the desired tensile modulus of the cured ink, the desired tensile strength of the cured ink, the desired resistance to distortion of the cured ink, and combinations thereof. In some embodiments, a reactive wax comprises about 5 to about 50 weight percent of an ink described herein (based on the total weight of the ink). In some embodiments, a reactive wax comprises about 5 to about 30 weight percent, about 5 to about 15 weight percent, or about 5 to about 10 weight percent of the ink.

Further, when an ink described herein comprises a plurality of reactive waxes, the plurality of reactive waxes can be present in any ratio not inconsistent with the objectives of the present invention. For example, in some embodiments, the weight ratio of a first reactive wax to a second reactive wax is between about 20:1 and about 1:20. In some embodiments, the ratio is between about 10:1 and about 1:10 or between about 5:1 and about 1:5. In some embodiments, the ratio is between about 1.5:1 and about 1:1.5 or between about 1.2:1 and about 1:1.2. In some embodiments, the ratio is between about 1.05:1 and 1:1.05. In some embodiments, the ratio is about 1:1 or between about 1:1 and about 20:1. For example, in some embodiments, an ink described herein comprises a first reactive wax comprising a chemical species of Formula (I) wherein x is 16, y is 1, and R is H and a second reactive wax comprising a chemical species of Formula (I) wherein x is 16, y is 3, and R is H. The ratio of a plurality of reactive waxes in an ink described herein, in some embodiments, can be altered based on one or more of a desired melting point and a desired cure time of the ink.

An ink described herein, in some embodiments, further comprises an additive that promotes rapid curing of the surface of the ink and/or promotes the production of a tack free finished part. Any suitable additive for these purposes not inconsistent with the objectives of the present invention may be used. In some embodiments, an additive that promotes rapid curing of the surface of an ink and/or promotes the production of a tack free finished part comprises an amine modified oligomer. A non-limiting example of an amine modified oligomer useful in some embodiments described herein is Ebecryl 83, which is an amine modified acrylate oligomer commercially available from Cytec Corp. In some embodiments, an amine modified oligomer may be present in any amount not inconsistent with the objectives of the present invention. In some embodiments, an amine modified oligomer is present in an ink as described herein in an amount ranging from about 1 to about 10 weight percent, based on the total weight of the ink. In some embodiments, an amine modified oligomer is present in an amount less than about 3 weight percent.

In some embodiments, an ink described herein further comprises one or more additives selected from the group consisting of photoinitiators, inhibitors, stabilizing agents, sensitizers, and combinations thereof. For example, in some embodiments, an ink further comprises one or more photoinitiators. Any photoinitiator not inconsistent with the objectives of the present invention can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 365 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate. The chemical structures of some photoinitiators are provided below:

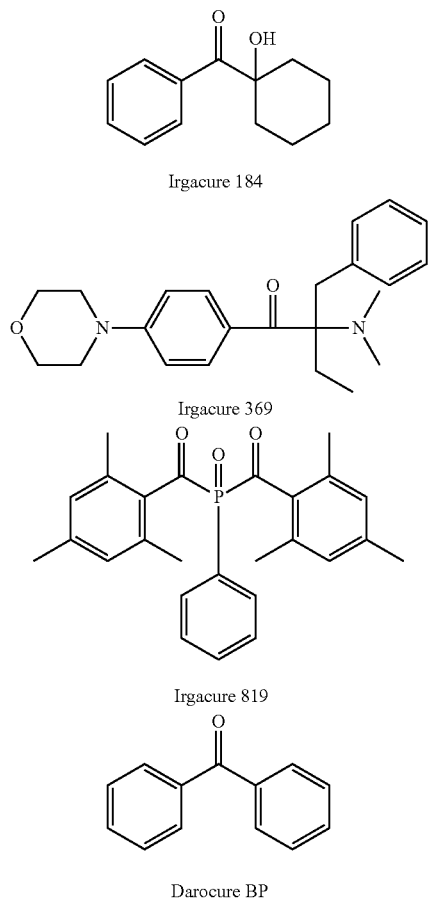

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1, 2-propanedione, 2-O-benzoyl oxime, aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some embodiments, suitable photoinitiators comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some embodiments, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some embodiments, comprises ionic dye-counter ion compounds capable of absorbing actinic radiation and generating free radicals for polymerization initiation. In some embodiments, inks containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530 and 4,772,541.

A photoinitiator can be present in an ink described herein in any amount not inconsistent with the objectives of the present invention. In some embodiments, a photoinitiator is present in an ink in an amount of up to about 5 weight percent, based on the total weight of the ink. In some embodiments, a photoinitiator is present in an amount ranging from about 0.1 weight percent to about 5 weight percent.

In some embodiments, an ink further comprises one or more sensitizers. A sensitizer can be added to an ink to increase the effectiveness of one or more photoinitiators that may also be present. Any sensitizer not inconsistent with the objectives of the present invention may be used. In some embodiments, a sensitizer comprises isopropylthioxanthone (ITX). In some embodiments, a sensitizer comprises 2-chlorothioxanthone (CTX).

A sensitizer can be present in an ink in any amount not inconsistent with the objectives of the present invention. In some embodiments, a sensitizer is present in an amount ranging from about 0.1 weight percent to about 2 weight percent, based on the total weight of the ink. A sensitizer, in some embodiments, is present in an amount ranging from about 0.5 weight percent to about 1 weight percent.

An ink, in some embodiments, further comprises one or more polymerization inhibitors or stabilizing agents. A polymerization inhibitor can be added to an ink to provide additional thermal stability to the composition. Any polymerization inhibitor not inconsistent with the objectives of the present invention may be used. In some embodiments, a polymerization inhibitor comprises methoxyhydroquinone (MEHQ). A stabilizing agent, in some embodiments, comprises one or more anti-oxidants. A stabilizing agent can comprise any anti-oxidant not inconsistent with the objectives of the present invention. In some embodiments, for example, suitable anti-oxidants include various aryl compounds, including butylated hydroxytoluene (BHT), which can also be used as a polymerization inhibitor in some embodiments described herein.

A polymerization inhibitor and/or a stabilizing agent can be present in an ink in any amount not inconsistent with the objectives of the present invention. In some embodiments, a polymerization inhibitor is present in an amount ranging from about 0.1 weight percent to about 2 weight percent, based on the total weight of the ink. A polymerization inhibitor, in some embodiments, is present in an amount ranging from about 0.5 weight percent to about 1 weight percent. In some embodiments, a stabilizing agent is present in an ink in an amount ranging from about 0.1 weight percent to about 5 weight percent or from about 0.5 weight percent to about 4 weight percent. In some embodiments, a stabilizing agent is present in an amount ranging from about 1 weight percent to about 3 weight percent.

Inks described herein are free or substantially free of non-reactive wax. For reference purposes herein, a non-reactive wax is a wax that does not include a functional group or chemical moiety that can react with a functional group of a polymerizable material described herein in a polymerization or cross-linking reaction. For instance, in some embodiments, a non-reactive wax is a wax that does not comprise an ethyleneically unsaturated moiety, such as a vinyl moiety or a (meth)acrylate moiety. In some embodiments, a non-reactive wax comprises a heat-storage phase change (SPC) wax. Non-limiting examples of non-reactive waxes include hydrocarbon waxes such as hydrogenated waxes, paraffin waxes, microcrystalline waxes, fatty ester waxes or mixtures thereof. Other examples of non-reactive waxes include urethane waxes. In some embodiments, a non-reactive urethane wax is a member of a class of inert linear urethane waxes having the chemical formula $C_{18}H_{37}NRCOOC_nH_{(2n+1)}$ wherein n is an integer from 4 to 16, and R is H or C1-C20 alkyl. In some embodiments, R is H. In some embodiments, R is C1-C6 alkyl. In some embodiments, R is C1-C10 alkyl. In some embodiments, R is C1-C20 alkyl. Additional non-reactive urethane waxes include. ADS038 [1-dodecyl-N-octadecyl carbamate: $CH_3(CH_2)_{17}NHCOO(CH_2)_{11}CH_3$] and/or ADS043 [1-hexadecyl-N-octadecyl carbamate: $CH_3(CH_2)_{17}NHCOO(CH_2)$ is $CH_3$] waxes.

In some embodiments, an ink described herein that is free or substantially free of non-reactive wax comprises less than about 5 weight percent non-reactive wax (based on the total weight of the ink). In some embodiments, an ink that is free or substantially free of non-reactive wax comprises less than about 3 weight percent non-reactive wax or less than about 1 weight percent non-reactive wax. In some embodiments, an ink that is free or substantially free of non-reactive wax comprises less than about 0.5 weight percent non-reactive wax or less than about 0.1 weight percent non-reactive wax. In some embodiments, an ink described herein does not comprise a non-reactive wax in any detectable amount and/or does not comprise any intentionally added non-reactive wax.

Inks described herein can exhibit a variety of desirable properties. For example, an ink described herein can have any freezing point, melting point, and/or other phase transition temperature not inconsistent with the objectives of the present invention. In some embodiments, an ink has freezing and melting points consistent with temperatures used in some 3D printing systems. In some embodiments, the freezing point of an ink is greater than about 40° C. In some embodiments, for example, an ink has a freezing point centered at a temperature ranging from about 45° C. to about 55° C. In some embodiments, an ink has a melting point centered at a temperature ranging from about 50° C. to about 80° C. An ink, in some embodiments, has a melting point ranging from about 50° C. to about 65° C.

In some embodiments, an ink exhibits a phase change between about 25° C. and about 55° C., wherein the phase change is not necessarily associated with a freezing or melting point of the ink. In some embodiments, the phase change is a liquid to semi-solid phase change. In other embodiments, the phase change is a liquid to solid phase change. A phase change of an ink described herein, in some embodiments, occurs between about 30° C. and about 50° C., between about 35° C. and about 45° C., or below about 40° C.

In some embodiments described herein, an ink exhibits a sharp freezing point or other phase transition. In some embodiments, an ink freezes over a narrow range of temperatures. In some embodiments, an ink freezes over a temperature range of about 1° C. to about 10° C. In some embodiments, an ink freezes over a temperature range of about 1° C. to about 8° C. In some embodiments, an ink freezes over a temperature range of about 1° C. to about 5° C. In some embodiments, an ink having a sharp freezing point freezes over a temperature range of X±2.5° C., where X is the temperature at which the freezing point is centered (e.g., X=65° C.).

In addition, an ink described herein, in some embodiments, is fluid at jetting temperatures encountered in 3D printing systems. Moreover, in some embodiments, an ink solidifies once deposited on a surface during the fabrication of a three dimensionally printed article or object. Alternatively, in other embodiments, an ink remains substantially fluid upon deposition on a surface. Solidification of an ink, in some embodiments, occurs through a phase change of the ink, such as freezing. The phase change, in some embodiments, comprises a liquid to solid phase change or a liquid to semi-solid phase change. In some embodiments, solidification of an ink comprises an increase in viscosity, such as an increase in viscosity from a low viscosity state to a high viscosity state, as described further hereinbelow.

In some embodiments, an ink described herein has a viscosity profile consistent with the requirements and parameters of one or more 3D printing systems. In some embodiments, for instance, an ink described herein has a viscosity ranging from about 8.0 centipoise (cP) to about 14.0 cP at a temperature of about 80° C. measured according to ASTM standard D2983 (e.g., using a Brookfield Model DV-II+ Viscometer). In some embodiments, an ink has a viscosity ranging from about 9.5 cP to about 12.5 cP at a temperature of about 80° C. An ink, in some embodiments, has a viscosity ranging from about 10.5 cP to about 12.5 cP at a temperature of about 80° C. In some embodiments, an ink has a viscosity ranging from about 8.0 cP to about 10.0 cP at a temperature of about 85-87° C.

In some embodiments, an ink described herein has a viscosity ranging from about 8.0 cP to about 19.0 cP at a temperature of about 65° C. measured according to ASTM standard D2983. In some embodiments, an ink described herein has a viscosity ranging from about 8.0 cP to about 13.5 cP at a temperature of about 65° C. An ink, in some embodiments, has a viscosity ranging from about 11.0 cP to about 14.0 cP at a temperature of about 65° C. In some embodiments, an ink has a viscosity ranging from about 11.5 cP to about 13.5 cP or from about 12.0 cP to about 13.0 cP at a temperature of about 65° C.

Further, inks described herein, in some embodiments, exhibit a combination of one or more desirable features. In some embodiments, for instance, an ink in the non-cured state has one or more of the following properties:
1. Melting point from about 50° C. to about 80° C.;
2. Jetting viscosity of about 8 to about 16 cP at 70-95° C.; and
3. Thermal stability for at least 3 days at the jetting temperature.

Viscosity can be measured according to ASTM D2983 (e.g., using a Brookfield Model DV-II+ Viscometer). In addition, for reference purposes herein, a thermally stable material exhibits no greater than about a 35 percent change in viscosity over a specified time period (e.g., 3 days) when measured at the specified temperature (e.g., a jetting temperature of 85° C.) at the beginning and at the end of the time period. In some embodiments, the viscosity change is no greater than about 30 percent or no greater than about 20 percent. In some embodiments, the viscosity change is between about 10 percent and about 20 percent or between about 25 percent and about 30 percent. Moreover, in some embodiments, the change in viscosity is an increase in viscosity.

Moreover, an ink described herein in a cured state, in some embodiments, can exhibit one or more desired properties. An ink in a cured state, in some embodiments, comprises an ink that includes a polymerizable material that has been at least partially polymerized and/or cross-linked. For instance, in some embodiments, a cured ink is at least about 10% polymerized or cross-linked or at least about 30% polymerized or cross-linked. In some embodiments, a cured ink is at least about 50%, at least about 70%, at least about 80%, or at least about 90% polymerized or cross-linked. In some embodiments, a cured ink is between about 10% and about 99% polymerized or cross-linked.

In some embodiments, an ink described herein can have one or more of the following properties in a cured state:
1. Tensile strength of at least about 35 MPa (as measured by ASTM D 638);
2. Tensile modulus of at least about 1300 MPa (as measured by ASTM D 638);
3. Break elongation of at least about 5% (as measured by ASTM D 638);
4. Hardness of at least about 40 shore D (as measured by ASTM D 2240);
5. Impact strength of at least about 0.2 ft-lb/in (10.7 N-cm/cm) (Izod notched, as measured by ASTM D 256);
6. Flexural strength of at least about 10 MPa (as measured by ASTM D 638); and
7. Flexural modulus of at least about 17 MPa (as measured by ASTM D 792).

In some embodiments, an ink described herein when cured exhibits a tensile modulus of about 1300 MPa to about 2800 MPa when measured according to ASTM D 638. In some embodiments, an ink described herein when cured exhibits a tensile modulus of about 1500 MPa to about 2000 MPa, about 2000 MPa to about 2800 MPa, or about 2300 MPa to about 2800 MPa when measured according to ASTM D 638.

In some embodiments, an ink when cured exhibits a break elongation of about 5% to about 40% when measured according to ASTM D 638. In some embodiments, an ink when cured exhibits a break elongation of about 15% to about 30% or about 20% to about 40% when measured according to ASTM D 638. In some embodiments, an ink when cured exhibits a break elongation of about 25% to about 40% or about 30% to about 40% when measured according to ASTM D 638.

In some embodiments, an ink when cured exhibits a tensile strength of about 35-55 MPa when measured according to ASTM D 638. In some embodiments, an ink when cured exhibits a tensile strength of about 40-50 MPa when measured according to ASTM D 638. In some embodiments, an ink when cured exhibits a tensile strength of about 45-50 MPa when measured according to ASTM D 638.

In some embodiments, an ink when cured exhibits a plurality of mechanical properties described herein. For example, in some embodiments, an ink when cured exhibits both a tensile modulus as described herein and a break elongation as described herein. In some embodiments, an ink when cured exhibits a tensile modulus of about 1300 MPa to about 2800 MPa when measured according to ASTM D 638 and a break elongation of about 5% to about 40% when measured according to ASTM D 638. In some embodiments, an ink when cured exhibits a tensile modulus of about 2400 MPa to about 2800 MPa when measured according to ASTM D 638 and a break elongation of about 25% to about 40% when measured according to ASTM D 638.

Inks described herein, in some embodiments, can also exhibit desirable properties at elevated temperatures. In some embodiments, for example, an ink when cured exhibits a heat deflection temperature (HDT) ranging from about 50° C. to about 120° C. when tested according to ASTM D 648. In some embodiments, an ink when cured exhibits an HDT ranging from about 70° C. to about 100° C. when tested according to ASTM D 648. In some embodiments, an ink when cured exhibits an HDT ranging from about 80° C. to about 120° C. or from about 105° C. to about 120° C. when tested according to ASTM D 648.

Inks described herein, in some embodiments, can be produced in any manner not inconsistent with the objectives of the present invention. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. The molten mixture is filtered while in a flowable state to remove any large undesirable particles that may interfere with jetting. The filtered mixture is then cooled to ambient temperatures until it is heated in the ink jet printer.

II. Compositions Comprising a 3D Printed Article

In another aspect, compositions comprising 3D printed articles or objects are described herein. In some embodiments, a composition comprises a three-dimensionally printed article comprising an ink, the ink comprising a polymerizable material and a reactive wax comprising a saturated alkyl moiety bonded to an ethyleneically unsaturated alkyl moiety through a urethane, urea, ester, or carbonate ester linkage, wherein the ink is free or substantially free of non-reactive wax. The polymerizable material and the reactive wax of the ink are not the same material but are instead separate components of the ink. Any ink described hereinabove in Section I may be used. For example, an ink of a composition described herein can comprise any combination of polymerizable materials, reactive waxes, and/or other additives described herein not inconsistent with the objectives of the present invention. In some embodiments, for instance, the polymerizable material of an ink comprises one or more species of (meth)acrylates and the reactive wax comprises an alkyl(meth)acrylate moiety. Moreover, in some embodiments, the linkage of a reactive wax comprises a urethane or urea linkage.

In addition, in some embodiments, the reactive wax of an ink of a composition described herein comprises the reaction product of an alkyl isocyanate having 2-36 carbon atoms in its alkyl chain and a hydroxyalkyl(meth)acrylate having 2-18 carbon atoms in its alkyl chain. Alternatively, in other embodiments, the reactive wax comprises the reaction product of an isocyanatoalkyl(meth)acrylate having 2-18 carbon atoms in its alkyl chain and a fatty alcohol having 4-36 carbon atoms in its alkyl chain. In some embodiments, the reactive wax of an ink of a composition described herein comprises a chemical species of Formula (I) described hereinabove in Section I. In some embodiments, the reactive wax comprises a chemical species of Formula (II) and/or Formula (III) described hereinabove in Section I. In some embodiments, the reactive wax of an ink of a composition described herein exhibits a melting point range centered between about 50° C. and about 80° C.

Therefore, in some embodiments, an article can be obtained by curing an ink described herein, including an ink comprising a polymerizable material and a reactive wax comprising a saturated alkyl moiety bonded to an ethyleneically unsaturated alkyl moiety through a urethane, urea, ester, or carbonate ester linkage, wherein the ink is free or substantially free of non-reactive wax. Further, in some embodiments, an article obtained by curing an ink described herein exhibits one or more of the following properties:

1. A tensile modulus of 2300 MPa to 2800 MPa or 2400 MPa to 2800 MPa when measured according to ASTM D 638;
2. A break elongation of 25% to 40% when measured according to ASTM D 638; and
3. A heat deflection temperature ranging from about 105° C. to about 120° C. when tested according to ASTM D 648.

In addition, in some embodiments, a 3D printed article of a composition described herein further comprises a support material. A support material can be used to support at least one layer of an ink during the 3D printing process. In some embodiments, a 3D printed article described herein comprises a plurality of layers of the ink, wherein the layers of the ink are deposited according to data in a computer readable format. In some embodiments, at least one of the deposited layers of ink is supported by a support material. In some embodiments, the support material is removable to complete production of the 3D printed article or object. In some embodiments, the support material is water-soluble and or water-dispersible and/or can be removed by applying water, including hot water. Hot water, in some embodiments, comprises water at a temperature above the melting point of the ink or a component of the ink, such as 70° C. or higher or 80° C. or higher. In some embodiments, hot water comprises water at a temperature between about 65° C. and about 90° C., between about 70° C. and about 85° C., or between about 80° C. and about 90° C.

Further, in some embodiments, a 3D printed article of a composition described herein exhibits color stability. A color stable 3D printed article, in some embodiments, does not develop or does not substantially develop a white surface residue or white surface appearance when heated and/or when exposed to water, including hot water. Heating, in some embodiments, comprises heating the printed article to a temperature greater than a melting point of a component of the ink of the printed article, such as a wax of the ink. In some embodiments, heating comprises heating the printed article to 70° C. or higher or 80° C. or higher. In some embodiments, heating comprises heating the printed article to a temperature between about 70° C. and about 100° C., between about 80° C. and about 100° C., between about 85° C. and about 100° C., or between about 65° C. and about 90° C. In some embodiments, a color stable 3D printed article comprises a 3D article that does not develop or does not substantially develop a white surface residue or white surface appearance when aged under ambient conditions for up to three months, up to six months, up to one year, or up to two years. In some embodiments, a 3D printed article does not develop or does not substantially develop a white surface residue or white surface appearance when aged under ambient conditions for 3 months to 1 year. In some embodiments, a 3D printed article does not develop or does not substantially develop a white surface residue or white surface appearance when aged for more than two years.

III. Methods of Printing a 3D Article

In another aspect, methods of printing a 3D article or object are described herein. In some embodiments, a method of printing a 3D article comprises selectively depositing layers of a fluid ink to form the 3D article on a substrate, the ink comprising a polymerizable material and a reactive wax comprising a saturated alkyl moiety bonded to an ethyleneically unsaturated alkyl moiety through a urethane, urea, ester, or carbonate ester linkage, wherein the ink is free or substantially free of non-reactive wax. The polymerizable material and the reactive wax of the ink are not the same material but are instead separate components of the ink. Any ink described hereinabove in Section I may be used.

In some embodiments, the layers of the ink are deposited according to an image of the three dimensional article in a computer readable format. In some embodiments, the ink is deposited according to preselected computer aided design (CAD) parameters.

In some embodiments, a method of printing a 3D article further comprises supporting at least one of the layers of the ink with a support material. Any support material not inconsistent with the objectives of the present invention may be used. In some embodiments, the support material is water soluble or water dispersible. Moreover, use of an ink described herein, in some embodiments, permits a water soluble or water dispersible support material to be removed from the cured ink using hot water without causing formation of a white residue or color on the printed part. Hot water, in some embodiments, comprises water at a temperature above the melting point of the ink or a component of the ink, such as 70° C. or higher or 80° C. or higher. In some embodiments, hot water comprises water at a temperature between about 65° C. and about 90° C., between about 70° C. and about 85° C., or between about 80° C. and about 90° C.

In some embodiments, a method of printing a 3D article further comprises curing the ink. In some embodiments, a method of printing a 3D article further comprises subjecting the ink to electromagnetic radiation of sufficient wavelength and intensity to cure the ink, where curing can comprise polymerizing one or more polymerizable functional groups of one or more components of the ink. In some embodiments of printing a 3D article, a layer of deposited ink is cured prior to the deposition of another or adjacent layer of ink. Thus, in some embodiments, an article such as an article described hereinabove in Section II can be obtained by a method described herein.

In some embodiments, a preselected amount of ink described herein is heated to the appropriate temperature and jetted through the print head or a plurality of print heads of a suitable inkjet printer to form a layer on a print pad in a print chamber. In some embodiments, each layer of ink is deposited according to the preselected CAD parameters. A suitable print head to deposit the ink, in some embodiments, is the piezoelectric 2850 print head available from Xerox Corporation's Office Products Business Unit in Wilsonville, Oreg. Additional suitable print heads for the deposition of ink and support material described herein are commercially available from a variety of ink jet printing apparatus manufacturers. For example, the Taipan print head available from Xerox or Ricoh print heads may also be used in some embodiments.

In some embodiments comprising a method of printing a 3D article comprising an ink as described herein, the ink remains substantially fluid upon deposition. In other embodiments, the ink exhibits a phase change upon deposition and/or solidifies upon deposition. In some embodiments, the temperature of the printing environment can be controlled so that the jetted droplets of ink solidify on contact with the receiving surface. In other embodiments, the jetted droplets of ink do not solidify on contact with the receiving surface, remaining in a substantially fluid state. In some embodiments, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. In some embodiments, the wiper device is heated. It should be noted that the consistency of the jetted ink described herein prior to curing, in some embodiments, must be sufficient to retain its shape and not be subject to excessive viscous drag from the planarizer.

Moreover, a support material, in some embodiments, can be deposited in a manner consistent with that described herein for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some embodiments, the deposited support material is also subjected to planarization.

Layered deposition of the ink and support material can be repeated until the 3D article has been formed. In some embodiments, a method of printing a 3D article further comprises removing the support material from the ink. The support material can be removed in any manner not inconsistent with the objectives of the present invention. In some embodiments, the support material is removed by applying hot water to dissolve and/or disperse the support material, as described herein.

Some embodiments described herein are further illustrated by the following non-limiting examples.

Example 1

Reactive Wax

A reactive wax for use in an ink according to one embodiment described herein was prepared as follows. Octadecyl isocyanate (295.50 grams, Sigma-Aldrich) and hydroxybutyl acrylate (144.17 grams, BASF) were charged into a reactor and heated to between 75° C. and 85° C. with agitation. The reaction was continued at this temperature for 7-8 hours with agitation. The resulting reactive wax was a solid with a melting point of 63-65° C.

Example 2

Reactive Wax

A reactive wax for use in an ink according to one embodiment described herein was prepared as follows. Octadecyl isocyanate (295.50 grams, Sigma-Aldrich) and hydroxyethyl methacrylate (130.14 grams, Sigma-Aldrich) were charged into a reactor and heated to between 75° C. and 85° C. with agitation. The reaction was continued at this temperature for 7-8 hours with agitation. The resulting reactive wax was a solid with a melting point of 73-75° C.

Example 3

Ink

An ink according to one embodiment described herein was provided in accordance with the formulation of Table I. The weight percents of Table I are based on the total weight of the ink.

TABLE I

| Ink | |
|---|---|
| Component | Amount (Wt. %) |
| Polymerizable Material[1] | 86.68 |
| Reactive Wax[2] | 9.36 |
| Photoinitiator[3] | 3.88 |
| Inhibitor[4] | 0.07 |
| Total | 100 |

[1] Mixture of BR-741 (31.22%) and SR 205 (55.46%), where weight percents are based on the total weight of the ink - Bomar Specialties Co., Winsted, CT, and SARTOMER Company, Exton, PA, respectively.
[2] $CH_3(CH_2)_{16}CH_2NHC(O)OCH_2(CH_2)_2CH_2OC(O)CH=CH_2$ - 3D Systems, Inc., Rock Hill, SC.
[3] Mixture of Irgacure 184 (2.91%) and Irgacure 819 (0.97%), where weight percents are based on the total weight of the ink - Ciba Specialty Chemicals, Inc. (BASF), Basel, Switzerland.
[4] BHT - Chemtura Corp. Middlebury, CT.

The polymerizable material (86.88 grams), reactive wax (9.36 grams), photoinitiator (3.89 grams), and inhibitor (0.07 grams) were charged into a vessel equipped with mechanical stirring and a heating unit. The mixture was then heated to about 80° C.-90° C. After the mixture was melted, stirring was begun, and the mixture was blended for about 1-2 hours at 80° C.-90° C. The liquid was then filtered with a 1 micron filter to remove solid particles. The ink provided in Table I had a viscosity of 10 cP at a temperature of 85° C. (measured with a Brookfield Model DV-II+ Viscometer).

The resulting ink was jetted at about 65° C.-68° C. through a ProJet™ 3000 System from 3D Systems using a Xerox Z 850 print head to form three dimensional parts. The cured ink exhibited a tensile modulus of 1899 MPa when tested according to ASTM D 638, a break elongation of 7% when tested according to ASTM D 638, and a tensile strength of 47.95 MPa when tested according to ASTM D 638.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. An ink for use in a three-dimensional printing system comprising:
  a polymerizable material;
  a first reactive wax comprising a saturated alkyl moiety bonded to an ethylenically unsaturated moiety through a urethane or urea linkage; and
  a second reactive wax comprising a saturated alkyl moiety bonded to an ethylenically unsaturated moiety through a urethane or urea linkage, wherein the ink is free or substantially free of non-reactive wax, wherein the first reactive wax and the second reactive wax are different, and wherein the first reactive wax and the second reactive wax each comprises a chemical species of Formula (I), Formula (II), or Formula (III):

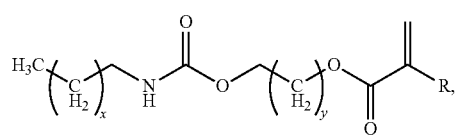

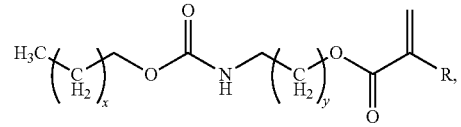

and

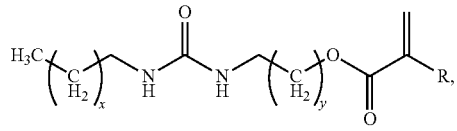

wherein x is an integer from 0 to 34, y is an integer from 1 to 17, and R is H or $CH_3$.

2. An ink for use in a three-dimensional printing system comprising:
  a polymerizable material; and
  a reactive wax comprising a saturated alkyl moiety bonded to an ethylenically unsaturated moiety through a urethane, urea, ester, or carbonate ester linkage, wherein the reactive wax comprises the reaction product of an isocyanatoalkyl(meth)acrylate having 2-18 carbon atoms in its alkyl chain and a fatty alcohol having 4-36 carbon atoms in its alkyl chain.

3. The ink of claim 1, wherein each of the first reactive wax and the second reactive wax comprises a chemical species of Formula (I):

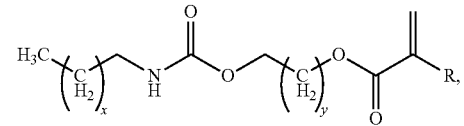

wherein x is an integer from 0 to 34, y is an integer from 1 to 17, and R is H or $CH_3$.

4. An ink for use in a three-dimensional printing system comprising:
  a polymerizable material; and
  a reactive wax comprising a saturated alkyl moiety bonded to an ethylenically unsaturated moiety through a urethane, urea, ester, or carbonate ester linkage, wherein the reactive wax comprises a chemical species of Formula (II):

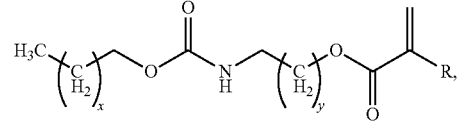

wherein x is an integer from 0 to 34, y is an integer from 1 to 17, and R is H or $CH_3$.

5. An ink for use in a three-dimensional printing system comprising:
  a polymerizable material; and
  a reactive wax comprising a saturated alkyl moiety bonded to an ethylenically unsaturated moiety through a urethane, urea, ester, or carbonate ester linkage, wherein the reactive wax comprises a chemical species of Formula (III):

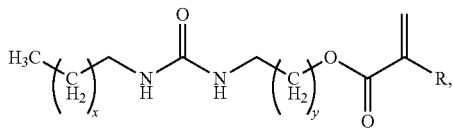
(III)

wherein x is an integer from 0 to 34, y is an integer from 1 to 17, and R is H or CH$_3$.

6. The ink of claim 1, wherein the reactive wax exhibits a melting point range centered between about 50° C. and about 80° C.

7. The ink of claim 1, wherein the polymerizable material comprises one or more species of (meth)acrylates.

8. The ink of claim 1, wherein the polymerizable material is UV-curable.

9. The ink of claim 1 further comprising one or more additives selected from the group consisting of photoinitiators, inhibitors, stabilizing agents, sensitizers, and combinations thereof.

10. The ink of claim 1, wherein the ink exhibits a phase change between about 25° C. and about 55° C.

11. A composition comprising:
a three-dimensionally printed article comprising an ink, the ink comprising a polymerizable material, a first reactive wax comprising a saturated alkyl moiety bonded to an ethylenically unsaturated alkyl moiety through a urethane or urea linkage, and a second reactive wax comprising a saturated alkyl moiety bonded to an ethylenically unsaturated moiety through a urethane or urea linkage, wherein the ink is free or substantially free of non-reactive wax, wherein the first reactive wax and the second reactive wax are different, and wherein the first reactive wax and the second reactive wax each comprises a chemical species of Formula (I), Formula (II), or Formula (III):

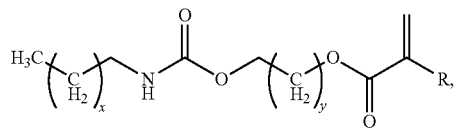
(I)

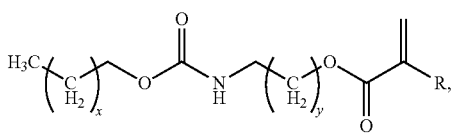
(II)

and

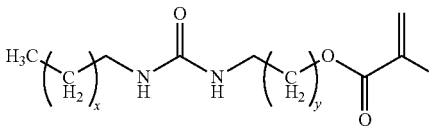
(III)

wherein x is an integer from 0 to 34, y is an integer from 1 to 17, and R is H or CH$_3$.

12. A method of printing a three dimensional article comprising:
selectively depositing layers of a fluid ink to form the three dimensional article on a substrate, the ink comprising a polymerizable material, and a first reactive wax comprising a saturated alkyl moiety bonded to an ethylenically unsaturated alkyl moiety through a urethane or urea linkage, and a second reactive wax comprising a saturated alkyl moiety bonded to an ethylenically unsaturated moiety through a urethane or urea linkage, wherein the ink is free or substantially free of non-reactive wax, wherein the first reactive wax and the second reactive wax are different, and wherein the first reactive wax and the second reactive wax each comprises a chemical species of Formula (I), Formula (II), or Formula (III):

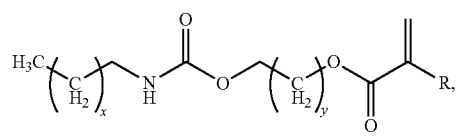
(I)

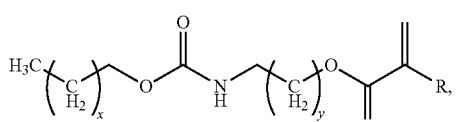
(II)

and

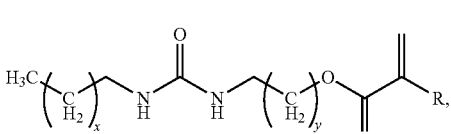
(III)

wherein x is an integer from 0 to 34, y is an integer from 1 to 17, and R is H or CH$_3$.

13. The composition of claim 1, wherein the weight ratio of the first reactive wax to the second reactive wax is between about 10:1 and about 1:10.

* * * * *